(12) United States Patent
Flockhart et al.

(10) Patent No.: US 6,661,889 B1
(45) Date of Patent: Dec. 9, 2003

(54) METHODS AND APPARATUS FOR MULTI-VARIABLE WORK ASSIGNMENT IN A CALL CENTER

(75) Inventors: Andrew Derek Flockhart, Thornton, CO (US); Robin H. Foster, Little Silver, NJ (US); Joylee E. Kohler, Northglenn, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/484,099

(22) Filed: Jan. 18, 2000

(51) Int. Cl.[7] .............................. H04M 3/00; H04M 5/00
(52) U.S. Cl. ............................... 379/265.05; 379/266.01
(58) Field of Search ........................ 379/265.02, 265.05, 379/265.06, 265.1, 265.11, 265.12, 266.01–266.03, 266.05–266.07, 309

(56) References Cited

U.S. PATENT DOCUMENTS

| | | | | |
|---|---|---|---|---|
| 5,206,903 A | | 4/1993 | Kohler et al. | 379/265.12 |
| 5,825,869 A | * | 10/1998 | Brooks et al. | 379/265.12 |
| 5,828,747 A | | 10/1998 | Fisher et al. | 379/265.12 |
| 5,903,641 A | * | 5/1999 | Tonisson | 379/265.12 |
| 5,905,793 A | | 5/1999 | Flockhart et al. | 379/266.06 |
| 6,453,038 B1 | * | 9/2002 | McFarlane et al. | 379/265.05 |

FOREIGN PATENT DOCUMENTS

| | | |
|---|---|---|
| EP | 0 949 793 A1 | 10/1999 |
| EP | 0 982 917 A1 | 3/2000 |
| EP | 0 982 918 A1 | 3/2000 |
| EP | 1 011 256 A2 | 6/2000 |
| EP | 1 017 216 A2 | 7/2000 |
| GB | 2 345 224 | 6/2000 |
| GB | 2 345 819 | 7/2000 |

OTHER PUBLICATIONS

"CentreVu® Virtual Routing: Cost–Effective Multisite Routing That Delivers Calls to the Best Place, the First Time," Lucent Technologies Inc., pp. 1–4, Aug. 1998.

"CentreVu® Advocate: The Revolutionary Routing Solution That Makes the Best Decision Every Time, Automatically," Lucent Technologies Inc., pp. 1–4, Aug. 1998.

J.P. Anderson et al., "Uncovering Maximum Leverage in Call Center Performance," Call Center Management, pp. 1–3, 1998.

(List continued on next page.)

Primary Examiner—Benny Tieu
(74) Attorney, Agent, or Firm—Ryan, Mason & Lewis, LLP (57) ABSTRACT

A multi-variable work assignment process is used to assign work items, such as voice calls, e-mails and other communications or tasks, to agents in a call center. The multi-variable work assignment process determines whether values of a particular variable characterizing the work items fall within a designated range, and if so utilizes at least one additional variable for making the work assignment decision. The work assignment process may also or alternatively consider a weighted combination of multiple variables in making the work assignment decision. Examples of variables which may be used in the multi-variable assignment process include current wait time, service objective, skill preference, skill level, anticipated wait time, predicted wait time, etc. The invention may be implemented in a one-to-many work assignment process which selects one of a set of agents available for handling a particular work item, in a many-to-one work assignment process which selects one of a set of work items for handling by a particular available agent, or in a many-to-many work assignment process in which multiple agents are each considered simultaneously for handling multiple work items.

19 Claims, 5 Drawing Sheets

OTHER PUBLICATIONS

"Lucent Technologies CentreVu® Call Center Solutions: CentreVu Virtual Routing," Lucent Technologies Inc., pp. 1–2, 1998.

"Lucent Technologies CentreVu® Call Center Solutions: CentreVu Advocate," Lucent Technologies Inc., pp. 1–2, 1998.

BCS Public Relations Press Releases, "Lucent Technologies Unveils Breakthrough Call Center Software That Improves Customer Care, Increases Sales and Reduces Costs: Predictive Algorithms Change Call Center Paradigm by Bringing Agent to Caller," Call Center '98, Dallas, Texas, pp. 1–3, Feb. 4, 1998.

"CentreVu® Advocate$^{SM}$ Research Simulation: Environments with CentreVu Advocate," Lucent Technologies Inc., pp. 1–3, 1998.

"Lucent's CentreVu® Advocate: Breakthrough Solutions for Success," Lucent Technologies Inc., pp. 1–4, 1998.

* cited by examiner

| AGENT INFO | | CALL INFO | | | | |
|---|---|---|---|---|---|---|
| SKILL | SKILL LEVEL | CURRENT WAIT | ANTICIPATED WAIT | PREDICTED WAIT TIME (PWT) | SERVICE OBJECTIVE (SO) | PWT/SO |
| A | LEVEL 2 | 19 sec | 16 sec | 35 sec | 30 sec | 1.170 |
| B | LEVEL 2 | 8 sec | 9 sec | 17 | 15 sec | 1.130 |
| C | LEVEL 1 | 26 sec | 19 sec | 45 sec | 40 sec | 1.125 |
| D | LEVEL 1 | 9 sec | 35 sec | 44 sec | 40 sec | 1.100 |

FIG. 4

| AGENT INFO | | | | | | CALL INFO | | | |
|---|---|---|---|---|---|---|---|---|---|
| AGENT 1 | | AGENT 2 | | AGENT 3 | | | | | |
| SKILL | SKILL LEVEL | SKILL | SKILL LEVEL | SKILL | SKILL LEVEL | CURRENT WAIT (AFTER 3 sec) | PREDICTED WAIT TIME (PWT) | SERVICE OBJECTIVE (SO) | PWT/SO |
| A | LEVEL 2 | | | A | LEVEL 1 | 19 sec | 35 sec | 30 sec | 1.170 |
| B | LEVEL 2 | B | LEVEL 1 | B | LEVEL 1 | 8 sec | 17 | 15 sec | 1.130 |
| C | LEVEL 1 | C | LEVEL 2 | C | LEVEL 2 | 26 sec | 45 sec | 40 sec | 1.125 |
| D | LEVEL 1 | | | | | 9 sec | 44 sec | 40 sec | 1.100 |

FIG. 5

| AGENT INFO | | | | | | | | | | CALL INFORMATION | | | |
|---|---|---|---|---|---|---|---|---|---|---|---|---|---|
| AGENT 1 | | AGENT 2 | | | AGENT 3 | | | | | | | | |
| SKILL | PLAN | ACTUAL | SKILL | PLAN | ACTUAL | SKILL | PLAN | ACTUAL | CURRENT WAIT | PREDICTED WAIT TIME | SERVICE OBJECTIVE | PWT/SO |
| A | 50% | 40% | | | | A | 20% | 25% | 19 sec | 35 sec | 30 sec | 1.170 |
| B | 20% | 15% | B | 40% | 45% | B | 20% | 15% | 8 sec | 17 | 15 sec | 1.130 |
| C | 20% | 25% | C | 60% | 50% | C | 60% | 40% | 26 sec | 45 sec | 40 sec | 1.125 |
| D | 10% | 5% | | | | | | | 9 sec | 44 sec | 40 sec | 1.100 |

FIG. 6

| AGENT 1 | | | AGENT 2 | | | AGENT 3 | | |
|---|---|---|---|---|---|---|---|---|
| SKILL | SKILL LEVEL (WEIGHT) | CUST. SAT. SCORE | SKILL | SKILL LEVEL (WEIGHT) | CUST. SAT. SCORE | SKILL | SKILL LEVEL (WEIGHT) | CUST. SAT. SCORE |
| A | LEVEL 2 (0.95) | 0.98 | | | | A | LEVEL 1 (1.0) | 0.95 |
| B | LEVEL 2 (0.95) | 0.96 | B | LEVEL 1 (1.0) | 0.89 | B | LEVEL 1 (1.0) | 0.98 |
| C | LEVEL 1 (1.0) | 0.90 | C | LEVEL 2 (0.95) | 0.92 | C | LEVEL 2 (0.95) | 0.98 |
| D | LEVEL 1 (1.0) | 0.96 | | | | | | |

FIG. 7

| AGENT | SKILLS AND WORK ASSIGNMENT SCORES | | | |
|---|---|---|---|---|
| | A | B | C | D |
| 1 | 1.170 x 0.95 x 0.98 = 1.089 | 1.130 x 0.95 x 0.96 = 1.031 | 1.125 x 1.0 x 0.90 = 1.013 | 1.100 x 1.0 x 0.96 = 1.056 |
| 2 | | 1.130 x 1.0 x 0.89 = 1.006 | 1.125 x 0.95 x 0.92 = 0.983 | |
| 3 | 1.170 x 1.0 x 0.95 = 1.115 | 1.130 x 1.0 x 0.98 = 1.1074 | 1.125 x 0.95 x 0.98 = 1.047 | |

FIG. 8

| AGENT | SKILLS AND WORK ASSIGNMENT SCORES | | | |
|---|---|---|---|---|
| | A | B | C | D |
| 1 | 1.16 x 0.95 x 0.98 = 1.080 | 1.130 x 0.95 x 0.96 = 1.031 | 1.125 x 1.0 x 0.90 = 1.013 | 1.100 x 1.0 x 0.96 = 1.056 |
| 2 | | 1.130 x 1.0 x 0.89 = 1.006 | 1.125 x 0.95 x 0.92 = 0.983 | |
| 3 | (ASSIGNED) | (ASSIGNED) | (ASSIGNED) | |

METHODS AND APPARATUS FOR MULTI-VARIABLE WORK ASSIGNMENT IN A CALL CENTER

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available service agents in accordance with various predetermined criteria. In even the busiest call center, situations can arise in which there is an opportunity to choose between two or more available agents to handle a particular call or other work item, a process referred to as agent selection. In addition, call centers routinely must assign to an available agent one of a number of work items awaiting service, a process referred to as work selection. Agent selection and work selection are also collectively referred to herein as work assignment.

Existing call centers generally utilize a fixed, sequential-approach to agent selection and work selection. Typically, a set of available agents or set of waiting work items is reduced in accordance with a fixed sequence of selection criteria until only one agent or work item remains. A significant problem with this fixed, sequential approach is that sometimes very minor differences between particular agents and work items can become the most influential in the selection, leading to an ultimate assignment decision that is not particularly well-aligned with business goals.

As an example, consider an agent selection process in which multiple agents are available to handle a given work item. The conventional approach applies a fixed, sequential series of steps in which a very small difference between values of a particular tested variable, if that variable is tested before other variables, can have an excessive amount of influence in reducing the set of agents from which to select. Although this problem may be alleviated in some circumstances by testing the variables in an order from most significant to least significant, a single fixed order of most significant to least significant may be difficult to define for all agents and all types of work items, particularly as the number of variables to be considered increases. Similar problems exist for the selection of one work item from among a set of multiple work items.

Agent selection in the above-noted fixed, sequential approach is typically limited to comparison of skill preference level and agent occupancy. Skill preference, if used, is generally considered first, without any comparison of agent occupancy at that preference level to the occupancy of agents at a lower preference level. Work selection in the fixed, sequential approach is generally limited to sequential elimination on the basis of factors such as skill preference, highest priority, and oldest waiting call.

Unfortunately, as noted above, these conventional agent selection and work selection techniques have been unable to provide optimum-performance and flexibility in terms of call center work assignment. A need therefore exists for improved techniques for assignment of work in a call center.

SUMMARY OF THE INVENTION

The invention provides methods and apparatus which improve the processing of calls or other work items in a call center. More particularly, the invention in an illustrative embodiment provides techniques for multi-variable assignment of work. In accordance with the invention, work items, such as voice calls, e-mails and other communications or tasks, are assigned to agents in a call center through a multi-variable work assignment process.

The multi-variable work assignment process may be configured to determine whether values of a particular variable characterizing the work items fall within a designated range, and if so to utilize at least one additional variable for, making the work assignment decision. The work assignment process may also or alternatively consider a weighted combination of multiple variables in making the work assignment decision.

Examples of variables which may be used in the multi-variable assignment process include current wait time, service objective, skill preference, skill level, anticipated wait time, predicted wait time, etc.

In an illustrative embodiment of the invention, a particular variable considered in an initial step of the work assignment process includes a ratio of a predicted wait time to a service objective for a given inbound voice call. If this ratio, as computed for each of a set of voice calls to be assigned, falls within a specified range of "essential equivalency," one or more additional variables such as current wait time, service objective, skill preference or anticipated wait time may be considered in the work assignment decision. The work assignment decision may also or alternatively be based at least in part on the skill levels associated with the work items, such that each agent is assigned a work item having the highest possible skill level.

In accordance with another aspect of the invention, the work assignment decision may be based at least in part on a comparison of a desired plan workload with an actual plan workload for each of the different types of work items to be assigned and for each of the available agents. In such an embodiment, the work items are assigned to the agents in a manner which tends to improve alignment of the corresponding actual plan workloads with the desired plan workloads.

In accordance with a further aspect of the invention, a weighting factor based on skill level may be applied to one or more of the multiple variables, such that the work assignment decision is based at least in part on the applied weighting factors. In one possible embodiment of this type, both a weighting factor and a customer satisfaction proficiency score are determined for each of the skill levels associated with the work items to be assigned. A product of (i) the weighting factor, (ii) the customer satisfaction proficiency score and (iii) a variable such as ratio of predicted wait time to service objective, is then computed for each of the work items, and the resulting products used to determine the appropriate work assignment.

Advantageously, the invention may be implemented in a variety of different types of work assignment processes. For example, the invention may be implemented in a one-to-many work assignment process which selects one of a set of agents available for handling a particular work item, in a many-to-one work assignment process which selects one of a set of work items for handling by a particular available agent, or in a many-to-many work assignment process in which multiple agents are each considered simultaneously for handling multiple work items.

By allowing multiple variables to be considered in agent selection and work selection processes, the present invention overcomes the drawbacks of the above-noted conventional techniques, and, thereby providing improved performance and flexibility, and better alignment of work assignment decisions with call center business goals. These and other features and advantages of the present invention will become more apparent from the accompanying drawings and the following detailed description.

DETAILED DESCRIPTION OF THE INVENTION

Although the invention will be illustrated below in conjunction with the processing of calls in an exemplary, call center, it is not limited to use with any particular type of call center or communication processing application. For example, the invention is applicable to the processing of incoming communications, outgoing communications or both. The disclosed techniques can be used with automatic call distribution (ACD) systems, telemarketing systems private-branch exchange (PBX) systems, computer-telephony integration (CTI)-based systems, as well as in combinations of these and other types of call centers. A call center in accordance with the invention may be configured using any type of network infrastructure, such as, e.g., a synchronous transfer mode (ATM), local area networks, wide area networks, Internet Protocol (IP) networks, etc. The term "call center" as used herein is thus intended to include any type of ACD system, telemarketing system or other communication system which processes calls or other service requests, including voice calls, video calls, multi-media calls, e-mail, faxes, text chat or voice messages as well as various portions or combinations of these and other types of communications. The term "call" as used herein is intended to include any of the above-noted types of communications as well as portions or combinations of these and other communications.

Figure 1:
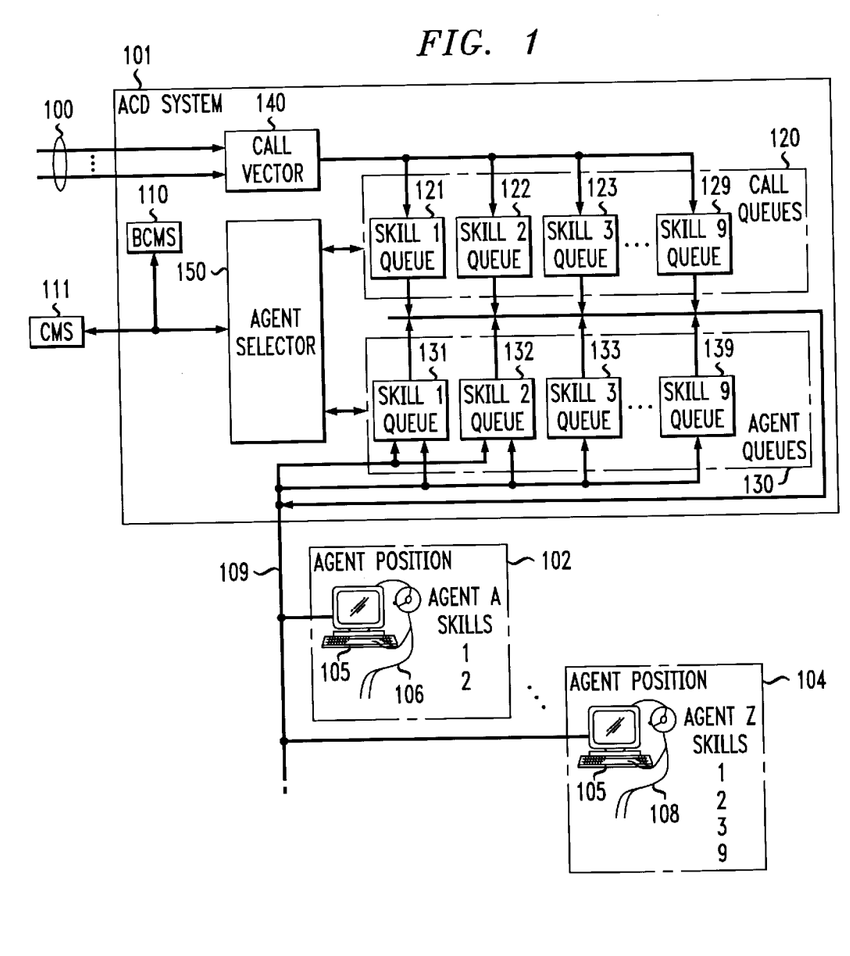
FIG. 1 is a block diagram of a call center in which one or more aspects of the present invention may be implemented.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 ay be provided using a single call management system internal or external to the ACD system 101.

Figure 2:
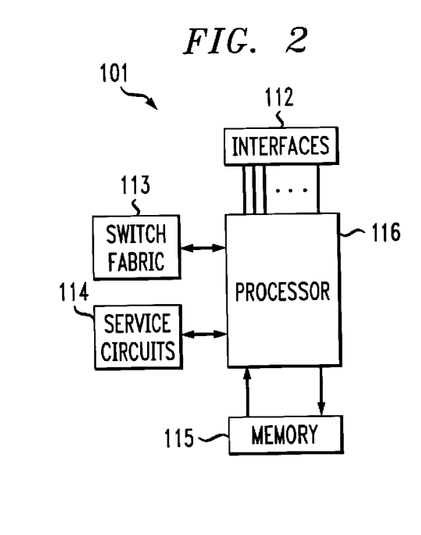
FIG. 2 is a block diagram of an automatic call distribution (ACD) system implemented in the call center of FIG. 1.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in, individual ones of the call queues 120 in their order of priority, or enqueued in different ones of a plurality of call queues, that correspond to a skill and each one of which corresponds to a different priority. Similarly, each a gent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels.

Call vectoring is described in greater detail in Definity® Communications System Generic 3 Call Vectoring/Expert Agent Selection (EAS) Guide, AT&T Publication No. 555-230-520, Issue Nov. 3, 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents.

The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 issued May 18, 1999 in the name of inventors A. D. Flockhart et al. and entitled "Waiting-Call Selection Based on Anticipated Wait Time s," and U.S. patent application Ser. No. 09/022,959 filed Feb. 12, 1998 and entitled "Call Center Agent Selection that Optimizes Call Wait Times," both of which are incorporated by reference herein.

In accordance with the present invention, the call center of FIG. 1 is configured to include capabilities for multi-variable work assignment. The term "work assignment" as used herein is intended to include agent selection, i.e., selecting one agent from among a group of agents to handle a particular work item, and work selection, i.e., selecting one work item from among a number of work items to be handled next by an available agent. Advantageously, the multi-variable work assignment techniques of the present invention allow for multiple variables to be analyzed simultaneously such that the most important factors in a given context can have the most influence in the assignment decision.

The invention in an illustrative embodiment provides a weighted analysis of multiple variables associated with each of a set of available agents or a set of work items. The invention further provides a defined interval of "essential equivalence" that can be invoked in the comparison of numbers, weighted calculations, percentages, defined labels, etc. as part of the weighted analysis of multiple variables. The concept of essential equivalence as applied to a given variable specifies a range of possible values of the variable which are to be considered equivalent in terms of their impact on the work assignment decision. For example, a percentage value of 85.3% may be essentially equivalent to a percentage value of 84.9%, a preference level 2 may be essentially equivalent to a preference level 3, or a Predicted Wait Time (PWT) calculation of 18 seconds may be essentially equivalent to a PWT calculation of 17 seconds.

By allowing multiple variables to be considered simultaneously, with designated intervals of essential equivalence specified for one or more of the variables, the invention ensures that potential agents or work items are not eliminated by a trivial difference in one variable while a more significant difference in another variable remains unexamined.

As will be illustrated in conjunction with FIGS. 3 through 8, the invention is applicable to one-to-many, many-to-one and many-to-many assignment processes. Conventional call centers have typically utilized either a one-to-many process or a many-to-one process in implementing assignment of work items to agents. In a one-to-many process, a single call arrives and the process chooses among "many" agents currently available to handle that call. In a many-to-one process, a single agent becomes available when many calls are in queue, and the process chooses which one of the "many" calls the agent should take.

Techniques for providing more efficient many-to-many work assignment are described in the U.S. Patent Application of A. D. Flockhart et al. filed Dec. 15, 1999 and entitled "Methods and Apparatus for Processing of Communications in a Call Center Based on Variable Rest Period Determinations," which is incorporated by reference herein. The many-to-many work assignment process implements assignments between many agents and many work items, as opposed to the conventional one-to-many or many-to-one processes described previously. The many-to-many work assignment process determines precisely which agents will become available in the near future so that decisions can be made based on a known pool of agents assigned in various ways to the known body of callers in queue. This precise knowledge regarding when agents are available for the next call may be based at least in part on information relating to variable rest periods granted to those agents. The process creates a buffered pool of agents by slightly delaying the work assignment decision such that multiple agents can be considered simultaneously for multiple calls. Additional details regarding many-to-many work assignment may be found in the above-referenced U.S. Patent Application.

Examples of multi-variable work assignment processes using the techniques of the invention will now be described with reference to FIGS. 3 through 8. As will be apparent, these examples incorporate the previously-described concept of essential equivalency.

Figure 3:
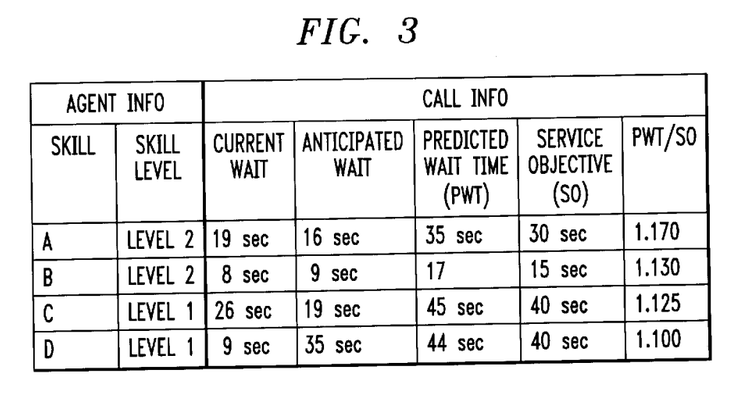
FIGS. 3 through 8 illustrate examples of multi-variable work assignment processes in accordance with the present invention.

FIG. 3 shows an example of a multi-variable work assignment process in a many-to-one situation, i.e., a situation in which a single agent becomes available when many calls are in queue, and the process chooses which one of the "many" calls the agent should take. The table in the figure shows data used to determine which of four waiting calls a given available agent should take. The agent has four skills, denoted Skills A, B, C and D, with Skills A and B held at preference level 2 and Skills C and D held at preference level 1. It is assumed that preference level 1 is more preferred than preference level 2 in this example.

The multi-variable work assignment process first identifies the skill for which the Predicted Wait Time (PWT) of a corresponding call is greatest relative to the Service Objective (SO) of the call. A ratio of PWT to SO is therefore computed, as shown, for each of the four waiting calls. For this example, the difference between the highest and lowest PWT/SO values is only 1.170−1.100=0.07. Conventional work assignment techniques would generally select the call with the largest PWT/SO value, even though selection of another call might result in improved performance or better achievement of call center goals.

In accordance with the invention, an essential equivalence test is performed on the resulting PWT/SO values. In this example, the essential equivalency test uses a specified tolerance or range of 0.1, although other larger or smaller ranges could of course be used. As a result of the test, all calls having PWT/SO values separated by less than the 0.1 range are considered essentially equivalent in terms of this particular variable.

The following tables illustrate the concept of essential equivalency in greater detail. In TABLE 1 below, exemplary PWT/SO values are shown in the first column, with the other columns denoting which of the values are considered essentially equivalent for the corresponding range. More particularly, the X entries in the table indicate which of the PWT/SO values are considered essentially equivalent for the corresponding range.

TABLE 1

| PWT/SO | Range = 0.1 | Range = 0.15 | Range = 0.2 |
|---|---|---|---|
| 1.33 | X | X | X |
| 1.25 | X | X | X |
| 1.20 |   | X | X |
| 1.14 |   |   | X |
| 1.03 |   |   |   |
| 0.80 |   |   |   |

Another example of essentially equivalency is given in TABLE 2 below. This table includes columns for agent, skill level, and three different ranges. In this case, the one or more X entries in a particular one of the range columns indicate which of the skill levels are considered essentially equivalent for that range. It can be seen from this example that the test of essential equivalence may result in a set of essentially equivalent choices which has only a single member.

TABLE 2

| Agent | Skill Level | Range = 0 | Range = 1 | Range = 2 |
|---|---|---|---|---|
| 1 | 2 | X | X | X |
| 2 | 3 |   | X | X |
| 3 | 4 |   |   | X |
| 4 | 6 |   |   |   |
| 5 | 6 |   |   |   |

Referring again to the FIG. 3 example, applying the above-described essential equivalency test with a specified range of 0.1 to the PWT/SO values for the four waiting calls results in all of these values being considered essentially equivalent. Therefore, the call selection will not be made based on the PWT/SO variable, but will instead be based on at least one other variable. Examples of these other variables include the following:

1. Longest Current Wait Time. This variable would lead the process to select the call corresponding to Skill C, which has a current wait time of 26 seconds. Such a decision is appropriate for a business that wants to keep all wait times as low as possible.

2. Lowest Service Objective. This variable would direct the process to select the call corresponding to Skill B, which has a service objective of 15 seconds. Such a decision is appropriate for a business that wants to defer to higher value calls, as indicated by service objective.

3. Call Waiting for More Preferred Skill. This variable would narrow the choice, in this specific example, to the calls corresponding to Skills C and D, with another factor, such as service objective, current wait time, or greatest PWT used to make a final decision between these two calls. Such a decision is appropriate for a business that wants to garner as much revenue per call as possible or to defer to the particular agent's desire to handle more of a certain type of call.

4. Highest Anticipated Wait Time. This variable would direct the process to select the call corresponding to Skill D, which has an anticipated wait time of 35 seconds. Such a decision is appropriate for a business that wants to reduce the risks associated with delaying the service of a call for a longer time.

Other examples of additional variables that may be used in a multi-variable work assignment process of the present invention include, e.g., a customer satisfaction proficiency score, a revenue score, i.e., an indicator of the revenue-generating capability of a particular agent, or other type of quality metric.

Figure 4:
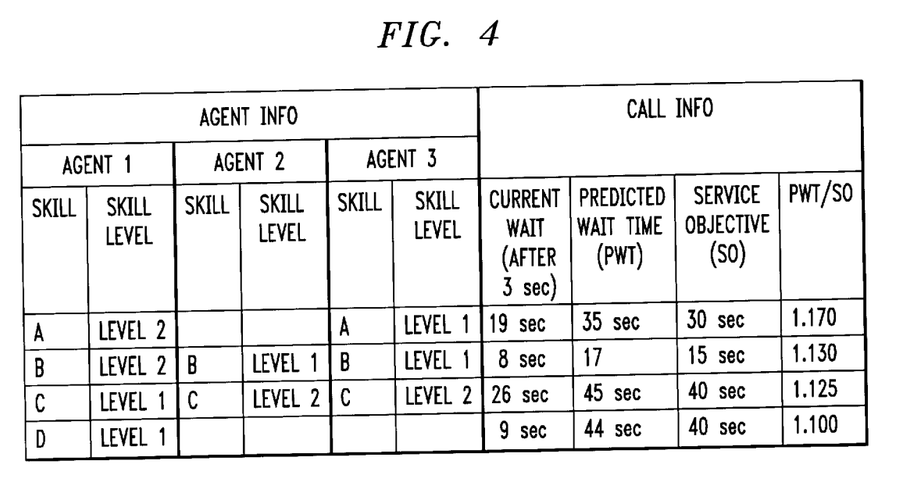

FIG. 4 shows an example of a multi-variable work assignment process in a many-to-many situation, i.e., a situation in which multiple agents are each considered simultaneously for handling multiple calls. In this example, three agents, denoted Agent 1, Agent 2 and Agent 3, are in a pool of agents known to become available in three seconds. Alternatively, the example may be viewed as an arrangement in which the three agents are presently available and four calls have been waiting less than a particular branded threshold of wait time. The former arrangement will be assumed for the remaining description of this example, although the techniques described are readily applicable to the latter arrangement as well as to other arrangements.

The chart in the figure shows the skills and skill levels for each of the three agents. Agent 1 corresponds to the particular agent in the example of FIG. 3. The current wait after the above-noted three seconds and the PWT and SO values for the four waiting calls are the same as in the FIG. 3 example.

In this example, with three agents becoming available for the four waiting calls, it is possible that the work assignment process will ultimately select three calls of different skills or three calls of the same skills, or two of one skill and one of another skill. Given this possibility, it may be important in this type of situation to have a view of the first three calls in each queue if there are in fact that many calls waiting in each queue. For simplicity and clarity of illustration, the present example will assume that there is only a single call in each queue. The techniques described can be extended in a straightforward manner to cover the situation in which there are multiple calls in each queue.

As in the previous example, an essential equivalency test is applied to the PWT/SO values, with the result that all four of the calls are considered essentially equivalent in terms of the PWT/SO variable, such that other variables are used to determine the work assignment.

Assume also that the next step in the work assignment process for this example is to examine the service objectives such that calls with lower service objectives are served first. This variable leads to the selection of the calls corresponding to Skills A and B, with service objectives corresponding to 30 seconds and 15 seconds, respectively. However, there is a tie in terms of service objective between the calls corresponding to. Skills C and D that must also be settled in order to determine which three of the four waiting calls will be selected for delivery to the three available agents.

Assume then that the next step in the work assignment process for deciding between the calls corresponding to Skills C and D is to select the call that has the highest current wait time. This variable leads to the selection of the call corresponding to Skill C. The set of selected calls is therefore the set of calls corresponding to Skills A, B and C.

Next, each of these calls must be assigned optimally to one of the three available agents, i.e., Agents 1, 2, and 3.

One possible variable that may be used in this part of the assignment process is skill level. In this case, an attempt is made to assign each agent a call at the highest possible skill level. For the FIG. 4 example, it is possible to provide each of the three agents with a call having a Level 1 skill level. More particularly, Agents 1, 2 and 3 are assigned the calls corresponding to Skills C, B and A, respectively. Numerous other variables could also be used in place of or in conjunction with skill levels.

Figure 5:
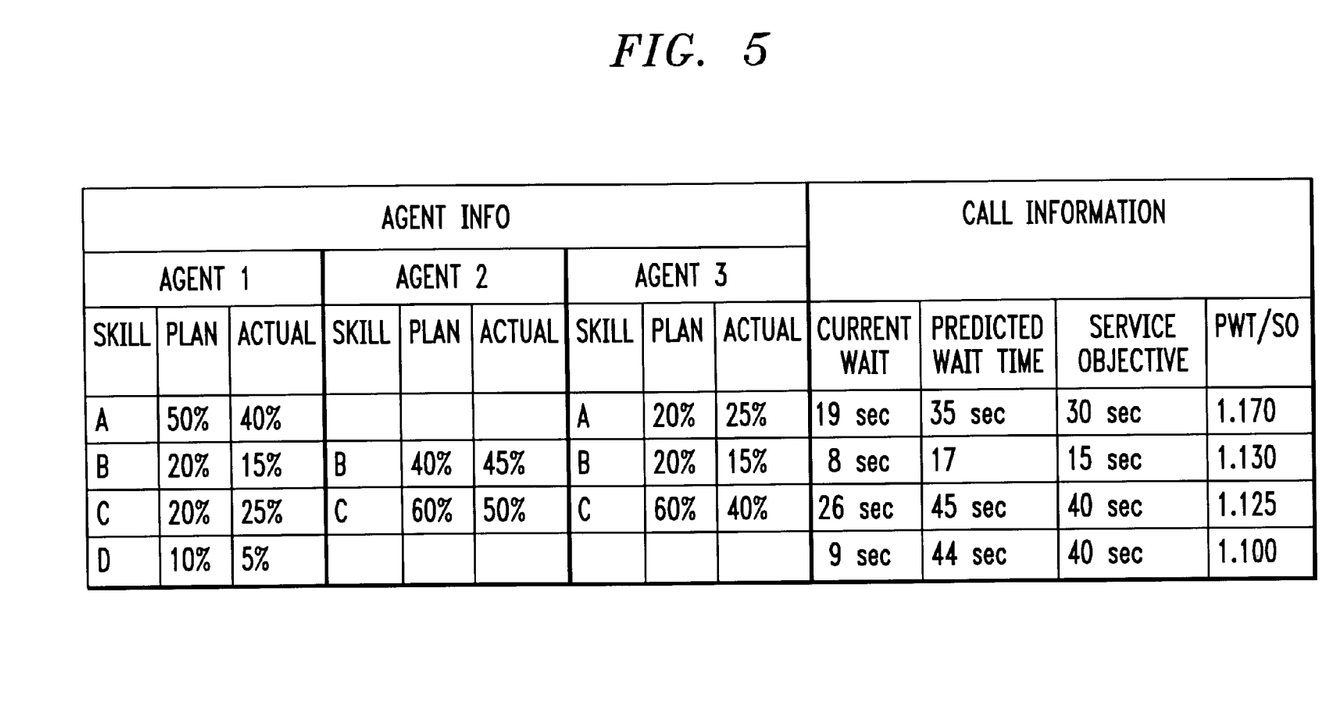

FIG. 5 shows an example in which the three agents, i.e., Agents 1, 2 and 3, are evaluated according to a desired workload for each type of call and the amount of time the agent has actually spent on each skill. In this case the assignment of the three calls, one from Skill A, one from Skill B, and one from Skill C, involves providing each agent with the call that best aligns their actual workload with the desired targets.

The call data for the FIG. 5 example is otherwise the same as that used in the previous examples of FIGS. 3 and 4. It is assumed that a determination has already been made that calls corresponding to skills A, B, and C will be selected, in the manner previously described.

In order to provide work assignments designed to achieve a targeted or planned workload for each skill, actual percentages are compared to plan percentages for each agent.

For Skill A, Agent 1 is below plan, and Agent 3 is above plan.

For Skill B, Agent 1 and Agent 3 are below plan, and Agent 2 is above plan.

For Skill C, Agent 1 is above plan, Agents 2 and 3 are below plan, but Agent 3 is further below plan than Agent 2.

Since Skill A presents the fewest choices of agents below plan, Agent 1 is assigned the call corresponding to Skill A. This assignment reduces the choices for Skill B to Agent 2. Therefore, Agent 2 is assigned the call corresponding to Skill B, and Agent 3 is assigned the call corresponding to Skill C.

A possible alternative work assignment process in accordance with the invention may assign the calls based on how far the agents are below plan. In the example of FIG. 5, Agent 3 has the greatest deficit against plan, in this case for Skill C. Therefore, Agent 3 might be assigned the call corresponding to Skill C as the first work assignment. Agent 1 has the next greatest deficit against plan, for Skill A, and so would be assigned the call corresponding to Skill A, with Agent 2 being assigned the call corresponding to Skill B.

Figure 6:
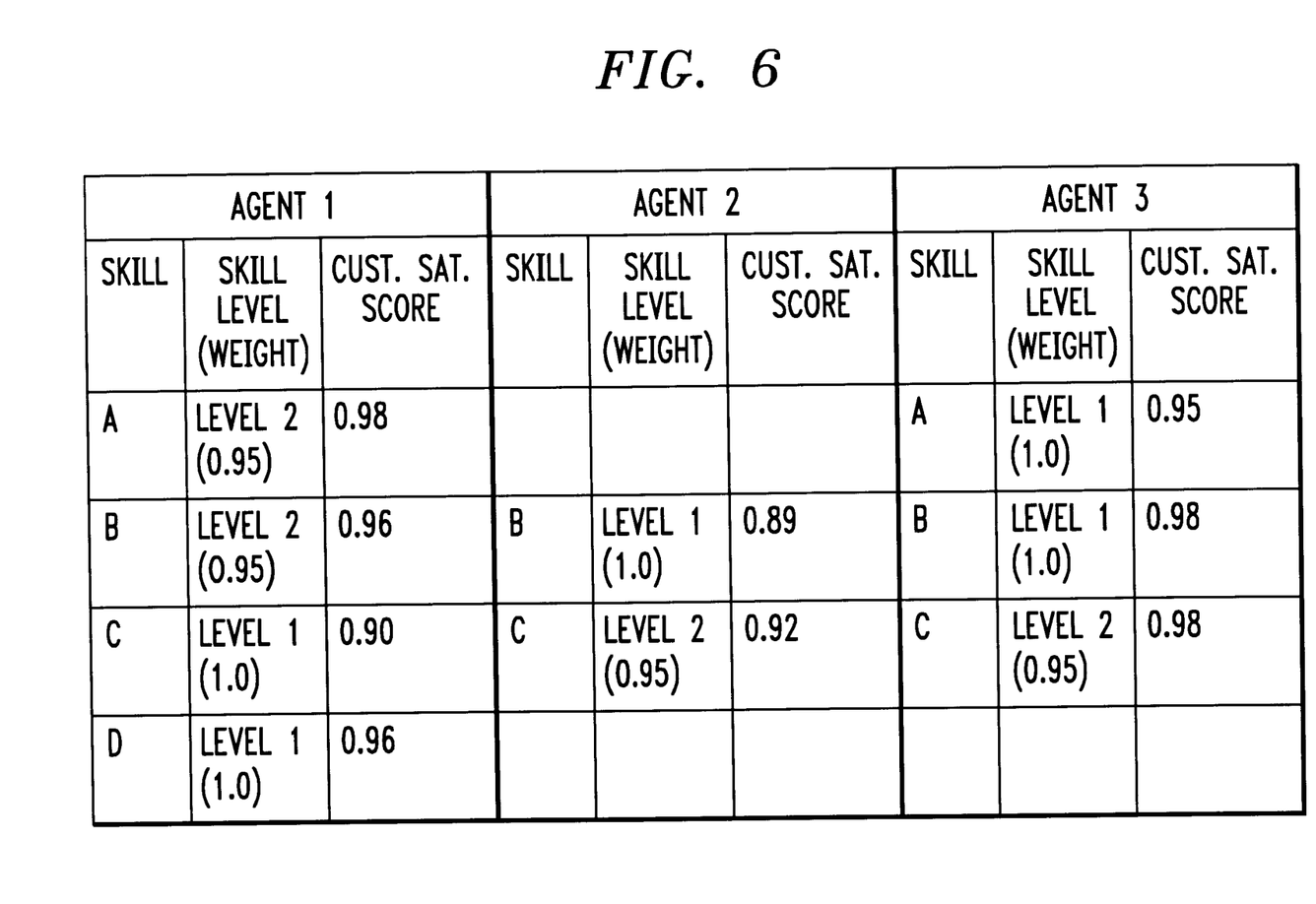

FIG. 6 shows another example of a work assignment process in accordance with the invention. In this example, a multi-variable work assignment process utilizes weighting factors to determine which of four waiting calls would be most ideal for each agent.

A system of weights is defined by the corresponding business or other entity operating the call center and is applied to the skill levels of Agents 1, 2 and 3 as follows:

Skill Level 1: weight factor 1.0
Skill Level 2: weight factor 0.95
Skill Level 3: weight factor 0.90, etc.

A customer satisfaction proficiency score for each agent for each skill is also assumed to be known. As will be described below, the customer satisfaction proficiency scores are used in a multiplicative fashion in conjunction with the weight factors, such that higher customer satisfaction proficiency scores for certain skills will bias an agent toward an assignment from those skills. Such scores can be determined in a conventional manner, as will be apparent to those skilled in the art, and the details of the score derivation are therefore not described herein.

The work assignment process then proceeds in the following manner. For each type of call an agent could handle, a product of the skill level weighting factor, the customer satisfaction proficiency score, and the PWT/SO is computed. FIG. 6 shows the skill levels, weights, and customer satisfaction proficiency scores for Agents 1, 2 and 3. The call data is the same as in the previous examples. However, the call corresponding to Skill D is not eliminated as in the examples of FIGS. 4 and 5.

It should be noted that the present invention may utilize the continuum skill level techniques described in U.S. patent application Ser. No. 09/219,995, filed Dec. 23, 1998 in the name of inventors R. A. Cohen and R. H. Foster and entitled "Call Selection Based on Continuum Skill Levels in a Call Center," which is incorporated by reference herein.

Figure 7:
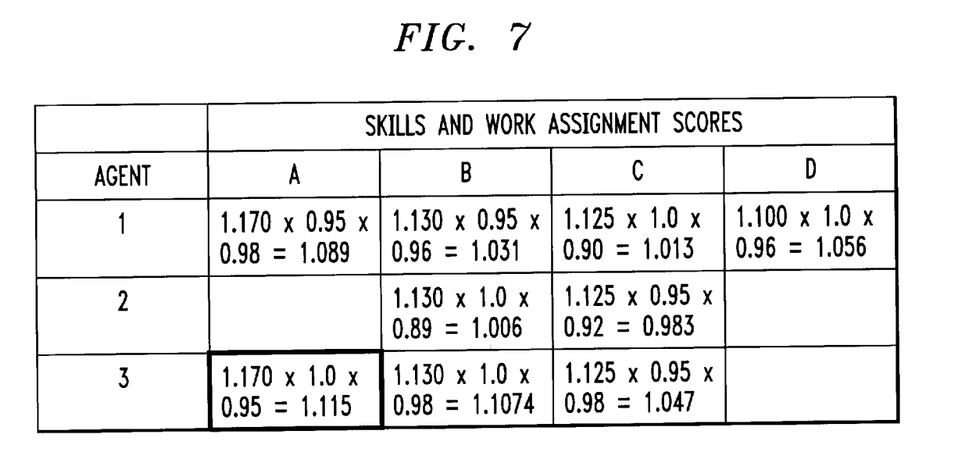

FIG. 7 shows the resulting work assignment scores for each of the Agents 1, 2 and 3 and the waiting calls that could potentially be handled by those agents.

The calls are assigned by identifying the highest scoring work assignment, and making that assignment first. In this example, this step identifies Agent 3 assigned Skill A as the highest scoring work assignment. Agent 3 is therefore assigned the call corresponding to Skill A. From the remaining work assignment scores, i.e., Agents 1 and 2 and the remaining calls corresponding to Skills B, C and D, the next highest scoring agent-call assignment is Agent 1 assigned Skill D. Agent 1 is therefore assigned the call corresponding to Skill D, and Agent 2 is assigned the call corresponding to Skill B.

Figure 8:
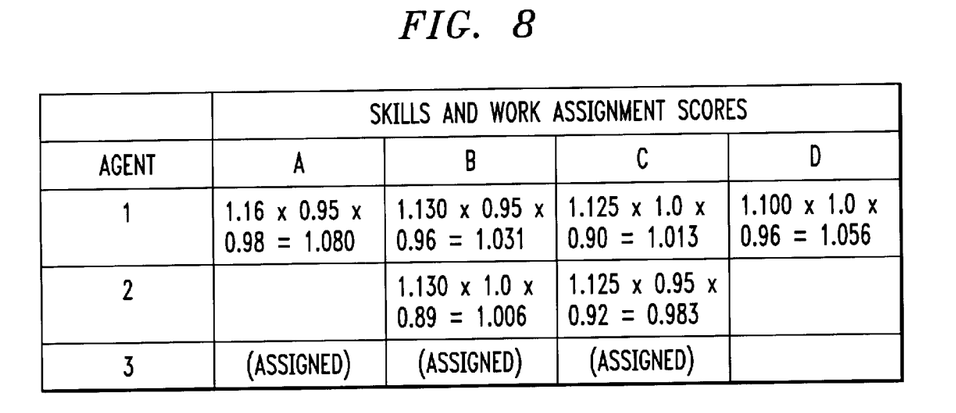

FIG. 8 shows an example of a multi-variable work assignment process in a many-to-many situation, with more than one call queued for at least one skill. In the previous examples, it was assumed that only one call was queued for each skill. If two or more calls appear in at least one of the queues for the skills that are under consideration, it may be the case that a more optimal assignment of calls for the pool of available agents would include two or more calls of the same skill.

In this case, the first work assignment is again made in the manner described in conjunction with the example of FIG. 7, i.e., the call corresponding to Skill A is assigned to Agent 3. However, with the assignment of Skill A to Agent 3, the next call in the queue for Skill A becomes a candidate for the next work assignment. As shown in FIG. 8, this call has a PWT/SO value of 1.16. Although the lower PWT/SO value results in a lower work assignment score, the second call for Skill A is nonetheless a candidate for the next work assignment. Based on the work assignment scores as shown in FIG. 8, the next assignment is such that the call associated with Skill A is assigned to Agent 1. If there were a third call waiting for Skill A, that call could be a candidate for the third work assignment. In this example, however, the final remaining agent, Agent 2, is not able to serve skill A. Therefore, the call corresponding to Skill B is assigned to Agent 2, as in the previous example.

The foregoing examples illustrate that multi-variable work assignment processes in accordance with the invention provide a substantially more flexible decision making capability than a conventional fixed, sequential approach, thereby improving performance relative to desired business objectives.

Other types of multi-variable work assignment processes may also be used in accordance with the invention. By way of example, one possible alternative to the approaches in the previous examples would be to consider substantially simultaneously all possible combinations of calls and agents. In a case in which there are three agents coming available and four waiting calls, work assignment scores can be given for each of the twelve possible combinations in accordance with the perceived value of each assignment. Then a function may be called to determine which subset of three assignments from the set of twelve assignments gives the highest overall perceived value for the business. As a simple numerical example, assume there are two calls denoted A and B, and two agents denoted Agent 1 and Agent 2. If the assignment scores are A1=100, A2=99, B1=99 and B2=20, the optimal assignment is A2 and B1, i.e., call A assigned to Agent 2 and call B assigned to Agent 1.

The exemplary systems of FIGS. 1 and 2 may be programmed or otherwise configured in a straightforward manner to implement one or more multi-variable work assignment processes such as those described above. The particular implementation details required in a given application will be readily apparent to those skilled in the art, and are therefore not described in detail herein.

The above-described multi-variable work assignment processes can be implemented in conjunction with various graphical representations of the variables, the weighting, the sequencing of a series of decisions, etc.

It should be understood that the work assignment techniques of the present invention are not limited to use with voice calls, but are instead more generally applicable to any tasks or other work items that arrive from a customer, e.g., e-mail, fax, text chat, voice over IP, etc., as well as to workflow and/or customer fulfillment generated work tasks that are part of, e.g., a workflow system in which various work tasks dealing with actual or electronic "paperwork," contacts with customers, approvals, etc. that must be completed in order to fulfill a specified customer need.

The invention may utilize a variety of different techniques for dealing with specific customer-agent relationships. For example, agent-specific calls may be automatically queued at the head of a particular queue. In processing the queued calls, the agent-specific calls are traversed until the first generic call in the queue is located, and then the process goes a specified number of calls deeper into the queue in order to obtain the total number of calls needed for implementing a multi-variable work assignment. Other techniques could also be used.

The invention can also be used in applications in which agents are permitted to select work from a work list. Such a list as generated for a given agent may be ordered or restricted in accordance with, e.g., a work assignment score.

A call center configured in accordance with the invention may be located at a single site or distributed over multiple sites. For example, the processing operations described above may be performed in a remote or centralized system before a given call or other communication is delivered to an available agent at a particular local site.

The above-described embodiments of the invention are intended to be illustrative only. For example, it should be noted that the exemplary configuration of the call center shown in FIG. 1 may be altered to incorporate a wide variety of different arrangements of components to provide the processing functions described herein. One such alternative arrangement may be configured such that the processing functions described herein are implemented in a so-called "off-board" server, e.g., a server outside of an ACD system. In this type of arrangement, one or more servers control the distribution of work to agents in an enterprise, such that the processing functions related to distribution can be moved in whole or in part from the ACD system to the servers. The term "call center" as used herein is intended to include these and other alternative systems in which the present invention can be implemented.

It should also be noted that the invention may be implemented at least in part in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide communication processing operations in accordance with the multi-variable work assignment techniques of the invention. These and numerous other alternative embodiments within the scope of the following claims will be apparent to those skilled in the art.

What is claimed is:

1. A method of assigning work items to agents in a call center, the method comprising the steps of:

determining if values of a particular variable regarding at least a subset of the work items fall within a designated range as part of a work assignment decision; and utilizing at least one additional variable for making the work assignment decision if the values of the particular variable are within the designated range;

wherein the determining step further comprises applying an equivalency test to the values of the particular variable;

wherein if the equivalency test indicates that the values do not fall within the designated range, the particular variable is utilized in making the work assignment decision; and wherein if the equivalency test indicates that the values do fall within the designated range, the additional variable is utilized in place of the particular variable in making the work assignment decision.

2. The method of claim 1 wherein the work assignment decision is based at least in part on a weighted combination of multiple variables.

3. The method of claim 1 wherein the work assignment decision is part of a one-to-many work assignment process involving a single work item in which the process selects one of a plurality of agents available for handling the single work item.

4. The method of claim 1 wherein the work assignment decision is part of a many-to-one work assignment process involving multiple work items in which the process selects one of the many work items for handling by a particular available agent.

5. The method of claim 1 wherein the work assignment decision is part of a many-to-many work assignment process in which multiple agents are each considered simultaneously for handling multiple work items.

6. The method of claim 1 wherein the work item comprises an in-bound or out-bound communication.

7. The method of claim 1 wherein the particular variable comprises a function of a wait time associated with a given work item.

8. The method of claim 7 wherein the particular variable comprises a ratio of a predicted wait time to a service objective for a given communication.

9. The method of claim 1 wherein the at least one additional variable comprises at least one of a current wait time, a service objective, a skill preference, an anticipated wait time, a predicted wait time, a customer satisfaction proficiency score and a revenue score.

10. The method of claim 1 wherein the work assignment decision is based at least in part on skill level associated with the work items, such that each agent is assigned a work item having the highest possible skill level.

11. The method of claim 1 wherein the work assignment decision is based at least in part on a comparison of a desired plan workload with an actual plan workload for each of a plurality of different types of work items and for each of at least a subset of the agents, and wherein the work items are assigned to the agents in a manner which tends to improve alignment of the corresponding actual plan workloads with the desired plan workloads.

12. The method of claim 1 wherein a weighting factor based on skill level is applied to at least one of the particular variable and the additional variable such that the work assignment decision is based at least in part on the applied weighting factors.

13. The method of claim 1 wherein at least one quality measure is determined for each of a plurality of skill levels associated with the work items to be assigned.

14. The method of claim 13 wherein the quality measure comprises at least one of a customer satisfaction proficiency score and a revenue score.

15. The method of claim 13 wherein a function of the quality measure and at least one of the variables is utilized in the work assignment decision.

16. The method of claim 15 wherein the function comprises a product of the quality measure, a skill level weighting factor, and at least one of the variables.

17. The method of claim 1 wherein multiple work items associated with a given skill are considered simultaneously for assignment to the agents.

18. An apparatus for use in assigning work items to agents in a call center, the apparatus comprising:

a processor operative to determine if values of a particular variable regarding at least a subset of the work items fall within a designated range as part of a work assignment decision, and to utilize at least one additional variable for making the work assignment decision if the values of the particular variable are within the designated range; and a memory coupled to the processor and operative to store information regarding at least a subset of the variables;

wherein the determining operation further comprises applying an equivalency test to the values of the particular variable;

wherein if the equivalency test indicates that the values do not fall within the designated range, the particular variable is utilized in making the work assignment decision; and wherein if the equivalency test indicates that the values do fall within the designated range, the additional variable is utilized in place of the particular variable in making the work assignment decision.

19. An article of manufacture containing one or more software programs for use in assigning work items to agents in a call center which, when executed in a processor, cause the processor to perform the steps of:

determining if values of a particular variable regarding at least a subset of the work items fall within a designated range as part of a work assignment decision; and utilizing at least one additional variable for making the work assignment decision if the values of the particular variable are within the designated range;

wherein the determining step further comprises applying an equivalency test to the values of the particular variable;

wherein if the equivalency test indicates that the values do not fall within the designated range, the particular variable is utilized in making the work assignment decision; and wherein if the equivalency test indicates that the values do fall within the designated range, the additional variable is utilized in place of the particular variable in making the work assignment decision.

* * * * *